US008985860B2

(12) United States Patent
Honjo

(10) Patent No.: US 8,985,860 B2
(45) Date of Patent: Mar. 24, 2015

(54) PRONG TYPE RESIN CAGE FOR DOUBLE ROW ROLLER BEARING AND DOUBLE ROW ROLLER BEARING

(71) Applicant: JTEKT Corporation, Osaka-shi, Osaka (JP)

(72) Inventor: Hayaki Honjo, Nagoya (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/229,426

(22) Filed: Mar. 28, 2014

(65) Prior Publication Data

US 2014/0301690 A1    Oct. 9, 2014

(30) Foreign Application Priority Data

Apr. 3, 2013 (JP) ................................. 2013-077598

(51) Int. Cl.
*F16C 33/48* (2006.01)
*F16C 19/28* (2006.01)
(Continued)

(52) U.S. Cl.
CPC ............. *F16C 33/4682* (2013.01); *F16C 19/28* (2013.01); *F16C 33/4605* (2013.01); *F16C 33/4676* (2013.01); *F16C 33/485* (2013.01); *F16C 33/498* (2013.01)
USPC ........... 384/576; 384/526; 384/531; 384/577; 384/580

(58) Field of Classification Search
CPC .......... F16C 19/28; F16C 33/38; F16C 33/41; F16C 33/46; F16C 33/48; F16C 33/49; F16C 33/485; F16C 33/467; F16C 33/4635

USPC ................. 384/470, 526–527, 531, 536, 572, 384/576–577, 580, 582, 621; 29/898.067
See application file for complete search history.

(56) References Cited

U.S. PATENT DOCUMENTS 2,375,145 A * 5/1945 Styri ............................. 384/577
3,975,066 A * 8/1976 Hofmann et al. ............. 384/526
5,352,047 A * 10/1994 Ingall et al. ................... 384/572
(Continued)

FOREIGN PATENT DOCUMENTS

DE         102 62 165 B4    7/2007
EP            0849482 A2 *   6/1998 ............ F16C 23/086
(Continued)

OTHER PUBLICATIONS

European Search Report issued Oct. 6, 2014 in European Application No. 14162548.3.

*Primary Examiner* — Marcus Charles
(74) *Attorney, Agent, or Firm* — Oliff PLC

(57) ABSTRACT

A prong type resin cage includes: an annular portion; and multiple cage bars. Each cage bar has a roller guide face formed in each opposed face thereof, the opposed face being opposed to an outer peripheral face of a corresponding one of rollers. The roller guide face is used for roller guide by the outer peripheral face at a rotational speed equal to or lower than a prescribed rotational speed. A cage outer face including an outer peripheral face of the annular portion and radially outer faces of the cage bars has outer ring guide faces of which diameter is increased radially outward by a centrifugal force to decrease a radial clearance between the outer ring guide faces and an inner peripheral face of the outer ring, so that outer ring guide by the inner peripheral face is carried out, at a rotational speed higher than the prescribed rotational speed.

13 Claims, 5 Drawing Sheets

(51) Int. Cl.
  *F16C 33/46*  (2006.01)
  *F16C 33/49*  (2006.01)

(56) References Cited

U.S. PATENT DOCUMENTS

| | | | | |
|---|---|---|---|---|
| 5,722,780 | A  * | 3/1998 | Scharman | 384/531 |
| 6,315,459 | B1 * | 11/2001 | Takano et al. | 384/580 |
| 7,101,088 | B2 * | 9/2006 | Yamamoto et al. | 384/470 |
| 7,530,743 | B2 * | 5/2009 | Yakura et al. | 384/572 |
| 8,579,516 | B2 * | 11/2013 | Muhamad | 384/577 |
| 2005/0069239 | A1 | 3/2005 | Yamamoto et al. | |
| 2011/0229066 | A1 | 9/2011 | Muhamad | |
| 2013/0223785 | A1 | 8/2013 | Yamamoto | |

FOREIGN PATENT DOCUMENTS

| | | | | |
|---|---|---|---|---|
| GB | 2 365 934 A | | 2/2002 | |
| JP | 2000220644 A | * | 8/2000 | ............. F16C 33/46 |
| JP | A-2004-301232 | | 10/2004 | |
| JP | 2005076732 A | * | 3/2005 | ............. F16C 33/48 |
| JP | A-2005-163997 | | 6/2005 | |
| JP | 2006292178 A | * | 10/2006 | |
| JP | A-2012-102796 | | 5/2012 | |
| WO | WO 03029670 A1 | * | 4/2003 | |

* cited by examiner

PRONG TYPE RESIN CAGE FOR DOUBLE ROW ROLLER BEARING AND DOUBLE ROW ROLLER BEARING

INCORPORATION BY REFERENCE

The disclosure of Japanese Patent Application No. 2013-077598 filed on Apr. 3, 2013 including the specification, drawings and abstract is incorporated herein by reference in its entirety.

BACKGROUND OF THE INVENTION

1. Field of the Invention

The invention relates to a prong type resin cage incorporated in a double row roller bearing, and a double row roller bearing including a prong type resin cage.

2. Description of the Related Art

A bearing portion by which a main spindle is rotatably supported in a machine toll is required to have a high degree of stiffness for the purpose of maintaining a high degree of machining accuracy. Thus, a double row roller bearing is used. Further, in recent years, because there has been a demand for speedup of rotation of a main spindle, a double row roller bearing capable of withstanding high-speed rotation has been required.

A double row roller bearing includes an inner ring, an outer ring, and a plurality of rollers. The rollers are arranged in two rows between the inner ring and the outer ring. For example, Japanese Patent Application Publication No. 2012-102796 (JP 2012-102796 A) (refer to FIG. 3) describes a double row roller bearing including independent cages each of which holds a plurality of rollers arranged in a corresponding one of the two rows. That is, the double row roller bearing includes two cages. Each of the cages has an annular portion and a plurality of cage bars. The cage bars extend in the axial direction of the cage from one side face of the annular portion, and are located at intervals in the circumferential direction of the cage. The cages are formed in a comb-shape. Pockets in which the rollers are held are defined between the cage bars that are adjacent to each other in the circumferential direction.

Because a prong type cage has a cantilever structure in which cage bars are projected from an annular portion in the axial direction, distal end portions of the cage bars are deformable to some extent. Thus, for example, even if rolling of rollers fails to keep up with the rotation of a double row roller bearing and thus tensile force and compression force repeatedly act on the cage bars, these forces are relieved. Therefore, the cages are less prone to damages. On the other hand, in a window-type cage in which paired annular portions are connected to each other via cage bars, the cage bars are fixed to the annular portions located on the respective sides of the cage bars, and thus deformation of the cage bars is restricted. Thus, if tensile force and compression force repeatedly act on the cage bars, these forces are not easily relieved. Therefore, the window-type cage is more susceptible to damages than the prong type cage is.

The rotational speed of a main spindle of a machine tool is selected from a range from a low rotational speed to a high rotational speed (e.g. 15,000 rpm), and is rotated at various speeds. The rotational speed of a double row roller bearing and the rotational speed of a cage incorporated in the double row roller bearing are both changed depending on variations in the rotational speed of the main spindle.

In the case of a double row roller bearing that is rotated at a high rotational speed, preferably, a cage is made of resin and "outer ring guide" is adopted, that is, the cage is positioned in the radial direction by the inner peripheral face of an outer ring. The outer peripheral face of an annular portion of the cage serves as a guide face that is guided by the inner peripheral face of the outer ring. That is, the cage is rotated in the circumferential direction while being guided at the outer peripheral face of the annular portion, by the inner peripheral face of the outer ring.

However, if the cage is rotated at a high speed such as 15,000 rpm, the cage is deformed so as to be enlarged in the radial direction by a centrifugal force. Thus, it is necessary to form a radial clearance between the outer peripheral face (guide face) of the annular portion of the cage and the inner peripheral face of the outer ring, the radial clearance containing beforehand an amount of deformation caused by the centrifugal force. If a large radial clearance is set in view of an amount of deformation caused by high-speed rotation, the radial clearance is unnecessarily large when the cage is rotated at a low rotational speed because the amount of deformation at a low rotational speed is smaller than that at a high rotational speed. Thus, the position of the cage in the radial direction is not fixed at a low rotational speed, and, for example, the contact between the cage and the inner peripheral face of the outer ring is repeated irregularly or regularly, resulting in noise generation.

SUMMARY OF THE INVENTION

One object of the invention is to make it possible to stably guide a prong type resin cage over the entire rotational speed range from a low rotational speed to a high rotational speed in a double row roller bearing.

An aspect of the invention relates to a prong type resin cage that is incorporated in a double row roller bearing in which multiple rollers are arranged in two rows between an inner ring and an outer ring, and that holds the rollers arranged in one of the two rows. The prong type resin cage includes: an annular portion; and a plurality of cage bars extended in an axial direction of the prong type resin cage from one side face of the annular portion, and located at intervals in a circumferential direction of the prong type resin cage. Each of the cage bars has a roller guide face formed in each opposed face of the cage bar, the opposed face being opposed to an outer peripheral face of a corresponding one of the rollers, the roller guide face being used for roller guide by the outer peripheral face when the prong type resin cage is rotated at a rotational speed equal to or lower than a prescribed rotational speed. A cage outer face including an outer peripheral face of the annular portion and radially outer faces of the cage bars has outer ring guide faces of which diameter is increased radially outward by a centrifugal force to decrease a radial clearance between the outer ring guide faces and an inner peripheral face of the outer ring, so that outer ring guide by the inner peripheral face of the outer ring is carried out, when the rotational speed of the prong type resin cage exceeds the prescribed rotational speed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
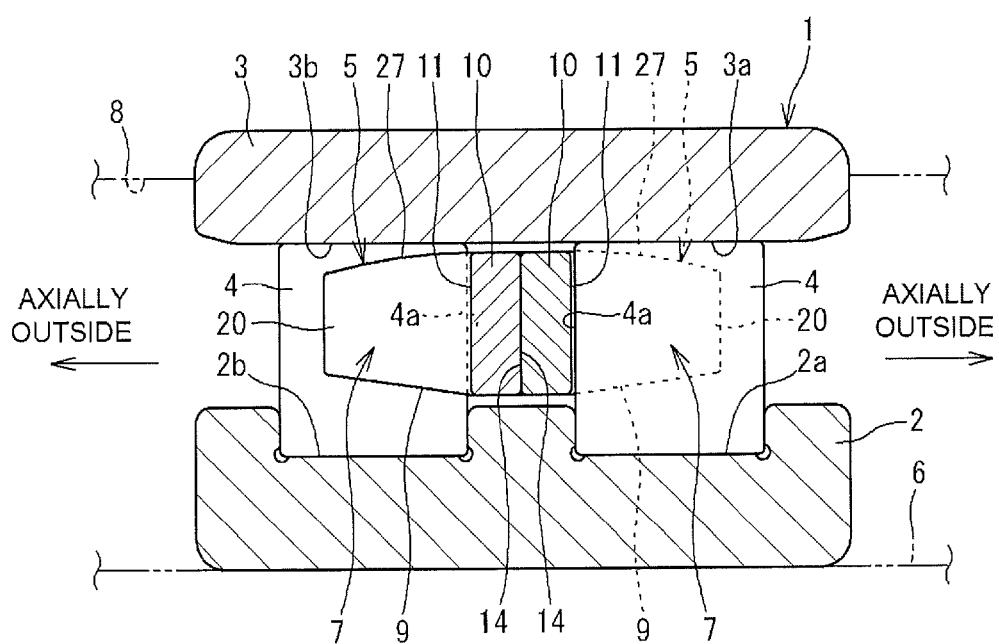
FIG. 1 is a sectional view of a double row roller bearing taken along its axial direction.

Hereinafter, embodiments of the invention will be described with reference to the accompanying drawings. FIG. 1 is a sectional view of a double row roller bearing 1 taken along its axial direction. Note that the same components in the drawings will be denoted by the same reference symbols (reference numerals), and the description of these components will not be repeated.

The double row roller bearing 1 is used as a bearing that supports a main spindle 6 of a machine tool such as a general purpose lathe, a CNC lathe, a machining center or a milling machine. The double row roller bearing 1 is capable of supporting the main spindle 6 rotated at a high speed, with a high degree of stiffness. The main spindle 6 has a diameter of, for example, approximately 50 to 150 mm, and the maximum rotational speed of the main spindle 6 is in a range from 10,000 to 15,000 rpm. The main spindle 6 may be rotated at a low speed, or at a high speed. The rotational speed of the main spindle 6, which has been rotated at a low rotational speed or which has been at a standstill, may be abruptly increased to a high rotational speed (maximum rotational speed).

The double row roller bearing 1 in the present embodiment includes an inner ring 2, an outer ring 3, a plurality of rollers 4, and annular cages 5. The rollers 4 are disposed between the inner ring 2 and the outer ring 3. The cages 5 hold the rollers 4. The rollers 4 are arranged in two rows. Each of the cages 5 holds the rollers 4 arranged in a corresponding one of the two rows. The cages 5 hold the rollers 4 independently from each other. That is, two independent cages 5 are incorporated in the double row roller bearing 1. Each of the rollers 4 has a cylindrical outer peripheral face, in other words, the double row roller bearing 1 is a double row cylindrical roller bearing.

Raceway surfaces 2a, 2b, on which the rollers 4 arranged in two rows roll, are formed on the outer peripheral face of the inner ring 2. Raceway surfaces 3a, 3b, on which the rollers 4 arranged in two rows roll, are formed in parts of the inner peripheral face of the outer ring 3. The outer ring 3 is fitted to the inner peripheral face of a bearing housing 8 of the machine tool. The main spindle 6 is passed through the inner ring 2. The double row roller bearing 1 is lubricated with grease, and the grease adheres to the inner ring 2, the outer ring 3, the rollers 4 and the cages 5.

The cage 5 for the rollers 4 arranged in one of the two rows and the cage 5 for the rollers 4 arranged in the other one of the two rows are the same except for the directions in which the cages 5 are fitted to the double row roller bearing 1. The cages 5 are arranged next to each other in the axial direction and incorporated in the double row roller bearing 1. The cages 5 are arranged such that a front side (one side face) 11 of each of the cages 5, which faces the axial direction of the cage 5, is oriented outward in the axial direction of the double row roller bearing 1, and thus annular back sides (the other side faces) 14 of the cages 5, which are opposed to each other, are allowed to contact each other. The cages 5 are rotatable independently from each other, and each of the cages 5 are rotatable together with the rollers 4 arranged in a corresponding one of the two rows.

Figure 2:
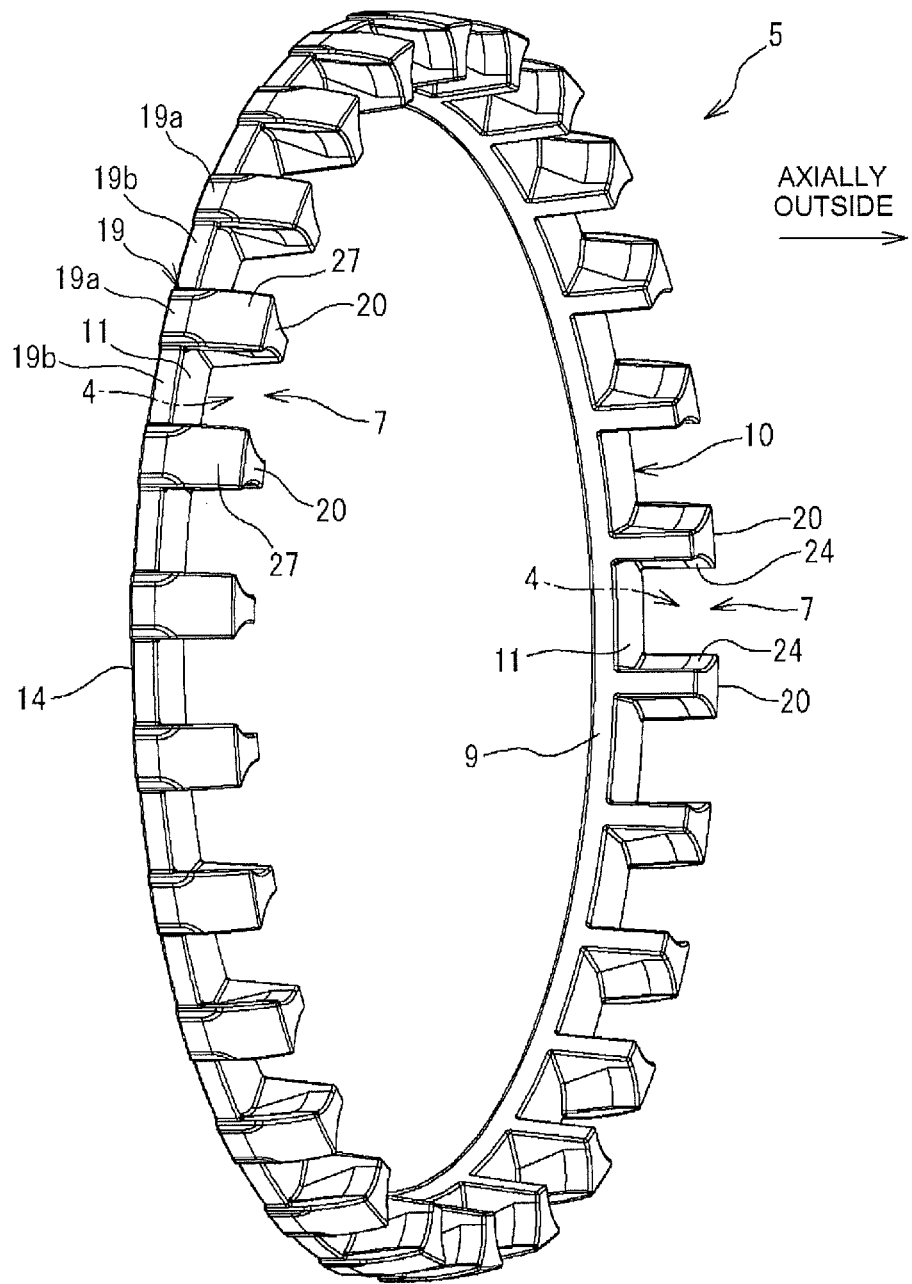
FIG. 2 is a perspective view of a cage.

FIG. 2 is a perspective view illustrating the cage 5 (the cage 5 on the right side in FIG. 1). The cage 5 is a prong type resin cage, and has an annular portion 10 and a plurality of cage bars 20. The cage bars 20 are arranged at intervals (at equal intervals) in the circumferential direction. The cage bars 20 are formed so as to extend in the axial direction from the front side 11 of the annular portion 10. Thus, the cage bars 20 are formed in a cantilever-shape so as to be projected from the annular portion 10. Note that the opposite side (the other side) of the cage 5 from the front side 11 in the axial direction is the back side 14. The back side 14 of each cage 5 is an annular smooth face, and serves as a mating face that is allowed to contact the back side 14 of the other cage 5 arranged next to the aforementioned cage 5 in the axial direction.

The cage 5 is made of resin (synthetic resin), and is formed by injection-molding. The annular portion 10 and the cage bars 20 are molded integrally with each other. The cage 5 may be made of a material such as polyether ether ketone (PEEK) or polyamide.

The cage bars 20 are arranged at equal intervals in the circumferential direction. Pockets 7 in which the rollers 4 are held are defined at positions on the side of the front side 11 of the annular portion 10 and between the cage bars 20 that are adjacent to each other in the circumferential direction. That is, each of the pockets 7 is a space that is surrounded by opposed faces 24 of the cage bars 20 arranged adjacent to each other in the circumferential direction and the front side 11 of the annular portion 10. The pockets 7 are opened outward in the axial direction, and thus the cage 5 has a comb-shape as a whole.

Figure 3:
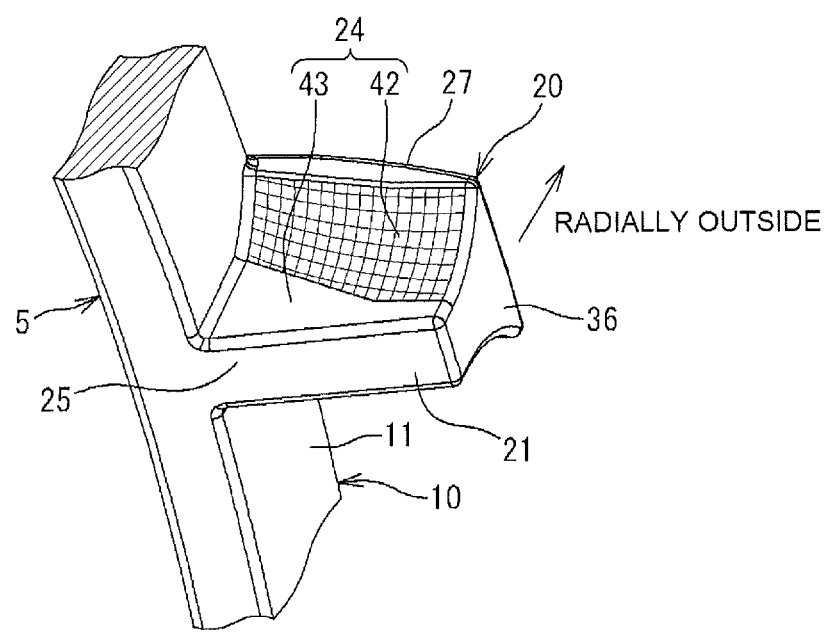
FIG. 3 is an enlarged view illustrating part of the cage in FIG. 2.
Figure 4:
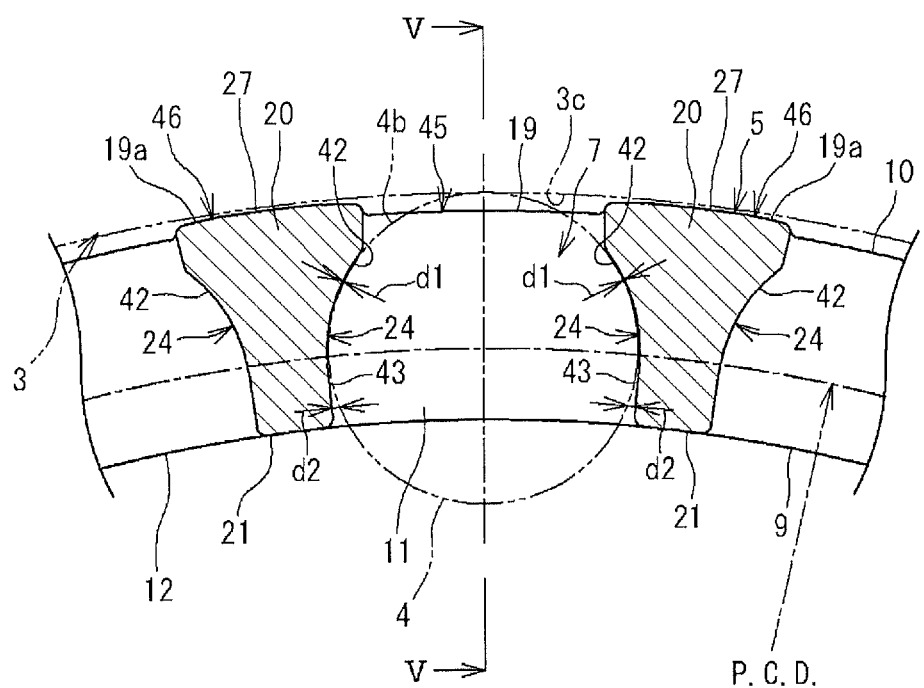
FIG. 4 is a view illustrating part of the cage as viewed from the axial direction of the cage.

FIG. 3 is an enlarged view illustrating part of the cage 5 in FIG. 2. FIG. 4 is a view illustrating part of the cage 5 as viewed from the axial direction of the cage 5. Each of the cage bars 20 has a distal end face 36, a radially inner face 21, a radially outer face 27 and the opposed faces 24 that are opposed to outer peripheral faces 4b of the rollers 4.

Each of the opposed faces 24 of each cage bar 20 has a face that is part of the opposed face 24 and that is opposed to the outer peripheral face 4b of a corresponding one of the rollers 4 across a clearance (refer to FIG. 4). This face serve as a roller guide face 42 formed of a circular arc face (rounded face), which will be described later. The cage 5 is elastically deformed radially outward by a centrifugal force as the cage 5 is rotated. However, when the rotational speed of the cage 5 is equal to or lower than a prescribed rotational speed N at which the cage bars 20 are not largely deformed (a centrifugal force is relatively small), the cage 5 is positioned in the radial direction, at the circular arc faces (roller guide faces 42), by the rollers 4 arranged in the corresponding row (roller guide). When the rotational speed of the cage 5 exceeds the prescribed rotational speed N, the centrifugal force exerted on the cage 5 increases and thus the cage bars 20 are deformed largely. In this state, the cage 5 is positioned in the radial direction, at mainly (a portion 19a of) the outer peripheral face 19 of the annular portion 10 (refer to FIG. 2), by the inner peripheral face of the outer ring 3 (outer ring guide). Thus, the roller guide and the outer ring guide are switched depending on the rotational speed of the cage 5. The configuration of the cage 5 for the roller guide and the outer ring guide will be described below.

The configuration for the roller guide will be described below. As illustrated in FIG. 3 and FIG. 4, each of the cage bars 20 has the roller guide face 42 in the opposed face 24 that is opposed to the outer peripheral face 4b of a corresponding one of the rollers 4. The roller guide face 42 is a circular arc face that is formed in a radially outer side region of the opposed face 24. The roller guide face 42 has such a shape as to conform to the outer peripheral face 4b of the roller 4 at a rotational speed equal to or lower than the prescribed rotational speed N, and is opposed to the outer peripheral face 4b across a prescribed roller clearance d1 (refer to FIG. 4). The roller guide face 42 is crosshatched in FIG. 3. The roller guide face 42 allows the roller guide by the outer peripheral face 4b of the roller 4 to be carried out. Note that the roller guide is carried out when the cage 5 is rotated at a rotational speed equal to or lower than the prescribed rotational speed N.

As illustrated in FIG. 3, a non-guide face 43 is formed in a region of the opposed face 24 of the cage bar 20, the region being located radially inward of the roller guide face 42. The non-guide face 43 is formed as a face at which there is a clearance d2 (refer to FIG. 4), which is larger than the clearance d1 at the roller guide face 42, between the non-guide face 43 and the outer peripheral face 4b of the roller 4. The non-guide face 43 in the present embodiment is a straight surface that is extended radially inward from the roller guide face 42. As illustrated in FIG. 3, the width of non-guide face 43 is increased radially outward along a direction toward a base portion 25 of the cage bar 20. Thus, the width of the roller guide face 42 is gradually decreased along a direction toward the base portion 25 of the cage bar 20.

Figure 5:
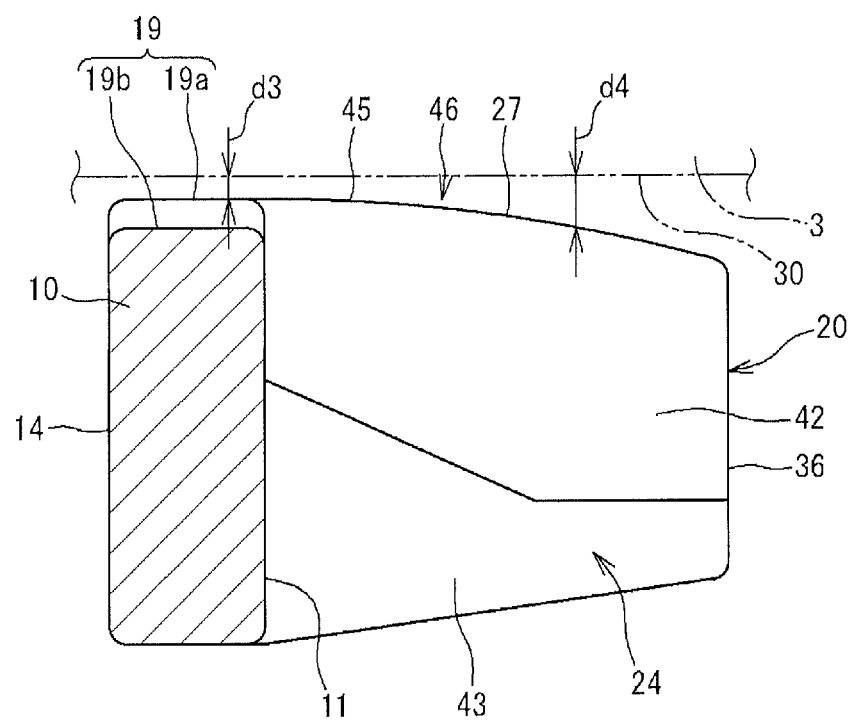
FIG. 5 is a sectional view of the cage taken along the line V-V in FIG. 4.

The configuration for the outer ring guide will be described below. FIG. 5 is a sectional view taken along the line V-V in FIG. 4. As illustrated in FIG. 4 and FIG. 5, a cage outer face 45 including the outer peripheral face 19 of the annular portion 10 and the radially outer faces 27 of the cage bars 20, has outer ring guide faces 46. Each of the outer ring guide faces 46 in the present embodiment includes a portion 19a of the outer peripheral face 19 of the annular portion 10, and the radially outer face 27 of a corresponding one of the cage bars 20. As illustrated in FIG. 2, the outer peripheral face 19 of the annular portion 10 has large diameter portions (portions 19a) and small diameter portions 19b. Each larger diameter portion (each portion 19a) is larger in diameter than each small diameter portion 19b, and serves as the portion 19a. Each small diameter portion 19b is smaller in diameter than each large diameter portion (each portion 19a). The large diameter portions (portions 19a) are formed at the same intervals as those of the cage bars 20 in the circumferential direction, and are continuous with the radially outer faces 27 of the cage bars 20. The large diameter portions (portions 19a) and the small diameter portions 19b are formed alternately in the circumferential direction of the cage 5.

As illustrated in FIG. 5, in each of the outer ring guide faces 46, the portion 19a (large diameter portion) of the outer peripheral face 19 of the annular portion 10 is a circular arc face having a radius slightly smaller than that of an inner peripheral face 3c of the outer ring 3, and a radial clearance d3 having a uniform width along the circumferential direction is formed between the portion 19a of the outer peripheral face 19 and the inner peripheral face 3c. The annular portion 10 is slightly deformed radially outward (the diameter of the annular portion 10 is slightly increased) by a centrifugal force as the cage 5 is rotated at a high rotational speed. Thus, the radial clearance d3 is set with an amount of deformation taken into account. That is, the radial clearance d3 is set such that a slight clearance is left between the portions 19a of the outer peripheral face 19 and the inner peripheral face 3c of the outer ring 3 even when the cage 5 is rotated at a high rotational speed and thus the diameter of the annular portion 10 is increased.

In each of the outer ring guide faces 46, the radially outer face 27 of the cage bar 20 is an inclined face that approaches toward the radially inside, along a direction toward the distal end of the cage bar 20 (refer to FIG. 5). That is, the radially outer face 27 of the cage bar 20 is an inclined face formed such that a radial clearance d4 between the radially outer face 27 and the inner peripheral face 3c of the outer ring 3 increases along the direction toward the distal end of the cage bar 20. Note that the inclined face (radially outer face 27) may be a linear inclined face. However, in the present embodiment, the radially outer face 27 is an inclined face of which the inclination angle is changed (increased) along the direction toward the distal end of the cage bar 20. When the rotational speed of the cage 5 exceeds the prescribed rotational speed N, the centrifugal force exerted on the cage bars 20 increases, and thus, the cage bars 20 are deformed radially outward. Thus, the radial clearance d4 is decreased. As a result, the outer ring guide by the inclined faces (radially outer faces 27) is carried out.

As described above, the cage bars 20 of the cage 5 are formed in a cantilever-shape so as to be projected from the annular portion 10 in the axial direction. When the centrifugal force is increased as the rotational speed of the cage 5 exceeds the prescribed rotational speed N, the cantilever-shaped cage bars 20 (in particular, the distal ends of the cage bars 20) are deformed radially outward. The radially outer face 27 of each cage bar 20 is an inclined face formed such that the radial clearance d4 between the radially outer face 27 and the inner peripheral face 3c of the outer ring 3 is increased along the direction toward the distal end of the cage bar 20. Thus, the radially outer face 27 is prevented from being brought into strong sliding contact with the inner peripheral face 3c of the outer ring 3. As a result, it is possible to prevent an increase in, for example, the rotating resistance of the cage 5.

Each portion 19a of the outer peripheral face 19 of the annular portion 10, which is included in a corresponding one of the outer ring guide faces 46, is deformed radially outward (the diameter of the portion 19a is increased) by the centrifugal force when the rotational speed of the cage 5 exceeds the prescribed rotational speed N. Thus, the annular portion 10 is deformed into a shape that conforms to the inner peripheral face 3c of the outer ring 3, and therefore the radial clearance d3 between the annular portion 10 and the inner peripheral face 3c is decreased. As a result, the outer ring guide by the inner peripheral face 3c is carried out. Each of the cage bars 20 is deformed radially outward by the centrifugal force when the rotational speed of the cage 5 exceeds the prescribed rotational speed N. Thus, the radially outer face 27 of each cage bar 20, which is included in a corresponding one of the outer ring guide faces 46, is deformed into a shape that conforms to the inner peripheral face 3c of the outer ring 3, and therefore the radial clearance d4 between the radially outer face 27 and the inner peripheral face 3c is decreased. As a result, the outer ring guide by the inner peripheral face 3c is carried out.

That is, each outer ring guide face 46 including the portion 19a of the outer peripheral face 19 of the annular portion 10 and the radially outer face 27 of the cage bar 20 is in a shape that conforms to the inner peripheral face 3c of the outer ring 3 in the state where the rotational speed of the cage 5 exceeds the prescribed rotational speed N. The diameter of each outer ring guide face 46 is increased radially outward by the centrifugal force when the rotational speed of the cage 5 exceeds the prescribed rotational speed N, and thus the radial clearances (d3, d4) between the outer ring guide face 46 and the inner peripheral face 3c of the outer ring 3 are decreased. As a result, at the outer ring guide faces 46, the outer ring guide by the inner peripheral face 3c of the outer ring 3 is carried out.

As described above, when the cage 5 is rotated at a rotational speed higher than the prescribed rotational speed N, the outer ring guide is carried out, that is, the cage 5 is guided by the inner peripheral face 3c of the outer ring 3. The roller guide that is carried out at a rotational speed equal to or lower than the prescribed rotational speed N will be described below. The cage bars 20 are deformed radially outward by the centrifugal force when the rotational speed of the cage 5 exceeds the prescribed rotational speed N, and thus the roller clearance d1 (refer to FIG. 4) increases. That is, the roller guide face 42 moves away from the outer peripheral face 4b of the roller 4. Therefore, when the cage 5 is rotated at a rotational speed higher than the prescribed rotational speed N, the roller guide is no longer carried out. Thus, when the rotational speed of the cage 5 is increased from a rotational speed equal to or lower than the prescribed rotational speed N up to a rotational speed higher than the prescribed rotational speed N, a switchover from the roller guide to the outer ring guide is made.

As described above, the cage 5 in the present embodiment is subjected to the roller guide by the roller guide faces 42 formed in the opposed faces 24 of the cage bars 20 in the state where the rotational speed of the cage 5 is equal to or lower than the prescribed rotational speed N. Thus, even if the radial clearance d3 between the cage outer face 45 (the portions 19a of the outer peripheral face 19 of the annular portion 10) and the inner peripheral face 3c of the outer ring 3 is set large by taking into account the fact that the cage 5 is deformed radially outward (the diameter of the cage 5 is increased radially outward) by the centrifugal force when the rotational speed of the cage 5 increases, the cage 5 is stably guided with no backlash in the double row roller bearing 1 when the cage 5 is rotated at a medium or low rotational speed equal to or lower than the prescribed rotational speed N. Each of the roller guide faces 42 in the present embodiment is a circular arc face having a shape that conforms to the outer peripheral face 4b of the roller 4, and thus the cage 5 is stably guided by the roller guide faces 42 (roller guide).

When the rotational speed of the cage 5 exceeds the prescribed rotational speed N, the diameter of each outer ring guide face 46 is increased radially outward by the centrifugal force, and thus the radial clearances (d3, d4) between the outer ring guide face 46 and the inner peripheral face 3c of the outer ring 3 decreases. As a result, the cage 5 is subjected to the outer ring guide. Thus, even when the cage 5 is rotated at a high rotational speed, the cage 5 is stably guided with no backlash in the double row roller bearing 1. That is, the cage 5 is stably guided in the double row roller bearing 1 over the entire rotational speed range from a low rotational speed to a high rotational speed.

As described above, the roller guide by the roller guide faces 42 formed in the opposed faces 24 of the cage bars 20 are carried out when the rotational speed of the cage 5 is equal to or lower than the prescribed rotational speed N. When the rotational speed of the cage 5 is higher than the prescribed rotational speed N, the outer ring guide by both the outer peripheral face 19 of the annular portion 10 and the radially outer faces 27 of the cage bars 20 is carried out.

Note that the prescribed rotational speed N varies depending on the size (diameter) of the double row roller bearing 1. For example, a dmn value is 600,000. Note that, the dmn value is obtained by {PCD (pitch circle diameter) of the bearing (mm)}·{rotational speed (mini$^{-1}$)}.

With reference to FIG. 3, because each cage bar 20 that is deformed radially outward by the centrifugal force is formed in a cantilever-shape, the amount of deformation of the cage bar 20 is small at the base portion 25 but is large at the distal end portion. Therefore, if the roller guide face 42 formed in each opposed face 24 of each cage bar 20 is a uniform circular arc face that is uniform over the entire length (entire axial length) of the cage bar 20, the clearance between the roller guide face 42 that is the circular arc face and the outer peripheral face 4b of the roller 4 is increased at the distal end portion 26 of the cage bar 20 when the rotational speed of the cage 5 exceeds the prescribed rotational speed N and thus a switchover to the outer ring guide is made. Thus, although the roller guide is reliably cancelled, the clearance between the roller guide face 42 and the outer peripheral face 4b of the roller 4 is not significantly changed at the base portion 25 of the cage bar 20. As a result, a state that is similar to the roller guide is left.

Therefore, in the present embodiment, the non-guide face 43, at which the roller clearance between the roller guide face 42 and the outer peripheral face 4b of the roller 4 is large, is formed in the region of each opposed face 24 of each cage bar 20, the region being located radially inward of the roller guide face 42. The width of the non-guide face 43 is increased radially outward, along the direction toward the base portion 25 of the cage bar 20. Thus, even if the amount of deformation of the base portion 25 is small, the clearance between the opposed face 24 and the outer peripheral face 4b of the roller 4 is made large at the base portion 25. As a result, it is possible to cancel the roller guide. That is, a switchover from the roller guide to the outer ring guide is reliably made when the rotational speed of the cage 5 exceeds the prescribed rotational speed N.

Because the cage 5 in each of the embodiments is made of resin, the rotational resistance of the cage 5 is lower than that of a cage made of metal (for example, brass). Therefore, the cage 5 generates lower noise, and is capable of withstanding higher-speed rotation. Some cages are made of brass (copper alloy). In particular, when a cage made of brass is used under high-speed rotation, for example, the inner peripheral face, the outer peripheral face, the pocket walls of the cage abrade due to the contact with the inner ring, the outer ring and the rollers, and as a result, abrasion powder is generated. If the abrasion powder is mixed into the grease for lubricating a double row roller bearing, the lubrication performance of the grease is reduced, which raises a possibility that seizure or damages of the double row roller bearing will occur. However, because the cage 5 in each of the embodiments is made of resin, it is possible to prevent reduction of the lubrication performance of the grease due to the abrasion powder as described above. That is, the cage 5 made of resin is more suitable for the use under high-speed rotation than a resin made of brass.

Because the prong type cage 5 has a cantilever structure in which the cage bars 20 are projected from the annular portion 10 in the axial direction, the distal end portions of the cage bars 20 are deformable to some extent. Thus, for example, even if rolling of the rollers 4 fails to keep up with the rotation of the double row roller bearing 1 and thus tensile force and compression force repeatedly act on the cage 5, these forces are relieved. Therefore, the cage 5 is less prone to damages.

The double row roller bearing and the cage according to the invention are not limited to the embodiments illustrated the drawings. The invention may be implemented in various other embodiments within the scope of the invention. For example, in the above-described embodiment, each outer ring guide face 46 includes a corresponding one of the portions 19a of the outer peripheral face 19 of the annular portion 10. That is, the portions 19a of the outer peripheral face 19 of the annular portion 10 are deformed radially outward by the centrifugal force so as to serve as the outer ring guide faces when the rotational speed of the cage 5 exceeds the prescribed rotational speed N. However, the entirety of the outer peripheral face 19 may be used as the outer ring guide face 46. That is, at least the portions 19a of the outer peripheral face 19 need to be included in the outer ring guide face 46. Further, the double row roller bearing 1 may be used for a purpose other than support of the main spindle 6 of the machine tool.

With the prong type resin cage and the double row roller bearing including the prong type resin cage, the cage is subjected to the roller guide by the roller guide faces formed in the opposed faces of each of the cage bars, the opposed faces being opposed to the outer peripheral faces of the rollers, when the rotational speed of the cage is equal to or lower than the prescribed rotational speed. When the rotational speed of the cage 5 is higher than the prescribed rotational speed, the diameter of each outer ring guide face formed in the cage outer face is increased radially outward by the centrifugal force to decrease the radial clearance between outer ring guide face and the inner peripheral face of the outer ring. As a result, the cage is subjected to the outer ring guide. Thus, the prong type resin cage is stably guided in the double row roller bearing over the entire rotational speed range from a low rotational speed to a high rotational speed.

What is claimed is:

1. A prong type resin cage that is incorporated in a double row roller bearing in which multiple rollers are arranged in two rows between an inner ring and an outer ring, and that holds the rollers arranged in one of the two rows, the prong type resin cage comprising:
    an annular portion; and
    a plurality of cage bars extended in an axial direction of the prong type resin cage from one side face of the annular portion, and located at intervals in a circumferential direction of the prong type resin cage, wherein
    each of the cage bars has a roller guide face formed in each opposed face of the cage bar, the opposed face being opposed to an outer peripheral face of a corresponding one of the rollers, the roller guide face being used for roller guide by the outer peripheral face when the prong type resin cage is rotated at a rotational speed equal to or lower than a prescribed rotational speed, and
    a cage outer face including an outer peripheral face of the annular portion and radially outer faces of the cage bars has outer ring guide faces of which diameter is increased radially outward by a centrifugal force to decrease a radial clearance between the outer ring guide faces and an inner peripheral face of the outer ring, so that outer ring guide by the inner peripheral face of the outer ring is carried out, when the rotational speed of the prong type resin cage exceeds the prescribed rotational speed,
    wherein the radially outer face of each of the cage bars is an inclined face formed such that a radial clearance between the radially outer face and the inner peripheral face of the outer ring increases along a direction toward a distal end of the cage bar.

2. The prong type resin cage for the double row roller bearing according to claim 1, wherein the roller guide face of each of the opposed faces of each of the cage bars is formed in a radially outer side region of the opposed face, and is a circular arc face having a shape that conforms to the outer peripheral face of the roller so as to be opposed to the outer peripheral face of the roller across a roller clearance when the rotational speed of the prong type resin cage is equal to or lower than the prescribed rotational speed.

3. The prong type resin cage for the double row roller bearing according to claim 2, wherein:
    when the rotational speed of the prong type resin cage is higher than the prescribed rotational speed, each of the cage bars is deformed radially outward by the centrifugal force to decrease the radial clearance, so that the inclined face serves as the outer ring guide face; and
    when the rotational speed of the prong type resin cage is higher than the prescribed rotational speed, each of the cage bars is deformed radially outward by the centrifugal force to increase the roller clearance, so that the roller guide is cancelled.

4. The prong type resin cage for the double row roller bearing according to claim 3, wherein each of the outer ring guide faces includes at least a portion of the outer peripheral face of the annular portion.

5. The prong type resin cage for the double row roller bearing according to claim 3, wherein:
    a non-guide face is formed in a region of each of the opposed faces of each of the cage bars, the region being located radially inward of the roller guide face;
    a clearance between the opposed face and the outer peripheral face of the roller is larger at the non-guide face than that at the roller guide face; and
    a width of the non-guide face increases radially outward along a direction toward a base portion of the cage bar.

6. The prong type resin cage for the double row roller bearing according to claim 2, wherein each of the outer ring guide faces includes at least a portion of the outer peripheral face of the annular portion.

7. The prong type resin cage for the double row roller bearing according to claim 2, wherein:
    a non-guide face is formed in a region of each of the opposed faces of each of the cage bars, the region being located radially inward of the roller guide face;
    a clearance between the opposed face and the outer peripheral face of the roller is larger at the non-guide face than that at the roller guide face; and
    a width of the non-guide face increases radially outward along a direction toward a base portion of the cage bar.

8. The prong type resin cage for the double row roller bearing according to claim 1, wherein each of the outer ring guide faces includes at least a portion of the outer peripheral face of the annular portion.

9. A double row roller bearing comprising:
    an inner ring;
    an outer ring;
    a plurality of rollers arranged in two rows between the inner ring and the outer ring; and
    a plurality of independent cages each of which holds the rollers arranged in a corresponding one of the rows, wherein
    each of the cages is a prong type resin cage having an annular portion and a plurality of cage bars extended in an axial direction of the prong type resin cage from one side face of the annular portion, and located at intervals in a circumferential direction of the prong type resin cage,
    each of the cage bars has a roller guide face formed in each opposed face of the cage bar, the opposed face being opposed to an outer peripheral face of a corresponding one of the rollers, the roller guide face being used for roller guide by the outer peripheral face when the prong type resin cage is rotated at a rotational speed equal to or lower than a prescribed rotational speed, and
    a cage outer face including an outer peripheral face of the annular portion and radially outer faces of the cage bars has outer ring guide faces of which diameter is increased radially outward by a centrifugal force to decrease a radial clearance between the outer ring guide faces and an inner peripheral face of the outer ring, so that outer ring guide by the inner peripheral face of the outer ring is carried out, when the rotational speed of the prong type resin cage exceeds the prescribed rotational speed, wherein the radially outer face of each of the came bars is an inclined face formed such that a radial clearance between the radially outer face and the inner peripheral face of the outer ring increases along a direction toward a distal end of the cage bar.

10. A prong type resin cage that is incorporated in a double row roller bearing in which multiple rollers are arranged in two rows between an inner ring and an outer ring, and that holds the rollers arranged in one of the two rows, the prong type resin cage comprising:

an annular portion; and a plurality of cage bars extended in an axial direction of the prong type resin cage from one side face of the annular portion, and located at intervals in a circumferential direction of the prong type resin cage, wherein each of the cage bars has a roller guide face formed in each opposed face of the cage bar, the opposed face being opposed to an outer peripheral face of a corresponding one of the rollers, a cage outer face including an outer peripheral face of the annular portion and radially outer faces of the cage bars has outer ring guide faces, wherein the radially outer face of each of the cage bars is an inclined face formed such that a radial clearance between the radially outer face and the inner peripheral face of the outer ring increases along a direction toward a distal end of the cage bar.

11. The prong type resin cage for the double row roller bearing according to claim 10, wherein each of the outer ring guide faces includes at least a portion of the outer peripheral face of the annular portion.

12. The prong type resin cage for the double row roller bearing according to claim 10, wherein:

a non-guide face is formed in a region of each of the opposed faces of each of the cage bars, the region being located radially inward of the roller guide face;

a clearance between the opposed face and the outer peripheral face of the roller is larger at the non-guide face than that at the roller guide face; and a width of the non-guide face increases radially outward along a direction toward a base portion of the cage bar.

13. The prong type resin cage for the double row roller bearing according to claim 10, wherein:

a non-guide face is formed in a region of each of the opposed faces of each of the cage bars, the region being located radially inward of the roller guide face;

a clearance between the opposed face and the outer peripheral face of the roller is larger at the non-guide face than that at the roller guide face; and a width of the non-guide face increases radially outward along a direction toward a base portion of the cage bar.

\* \* \* \* \*